A. TURNBULL.
TIRE WRENCH.
APPLICATION FILED OCT. 4, 1912.

1,137,555.

Patented Apr. 27, 1915.

Witnesses:
J. M. Wynkoop
H. B. Chinn

Inventor
Alexander Turnbull,
By Knight Bros
his Attorneys

UNITED STATES PATENT OFFICE.

ALEXANDER TURNBULL, OF GLASGOW, SCOTLAND.

TIRE-WRENCH.

1,137,555.

Specification of Letters Patent.

Patented Apr. 27, 1915.

Application filed October 4, 1912. Serial No. 723,923.

*To all whom it may concern:*

Be it known that I, ALEXANDER TURNBULL, of the firm of Alex. Turnbull & Co., Limited, St. Mungo Works, Bishopbriggs, Glasgow, Scotland, engineer, have invented a new and useful Tire-Wrench, of which the following is a specification.

This invention relates to improved appliance for use in loosening, detaching or placing pneumatic or other tires.

It frequently happens that the pneumatic or other tire adheres firmly to the wheel rim and it is difficult to displace same and the primary object of my invention is to get over this difficulty by providing a more simple and efficient appliance for use in loosening or attaching the tires than those presently in existence, but it has also for its object to assist in placing the tire in position on the wheel rim.

According to my invention, I provide a bracket arrangement one end of which is in the form of a jaw which passes over the rim or over the tire and one end of which engages with the rim. I also provide a toothed segment or pinion which is separate from the actuating lever. The teeth of the segment or pinion engage with corresponding teeth formed in a channel toward the bottom of bar or ram which slides in the other end of bracket. One end of the sliding bar or ram is suitably formed so as to press against the pneumatic or other tire and so loosen the tire from the rim. By this arrangement the teeth in the sliding bar or ram are protected, and the pinion prevents the sliding bar or ram from turning. The sliding bar or ram may be made in two pieces, or the end made detachable so that a longer sliding bar or ram may be used in order that the appliance may be applicable to various sizes of tires. The appliance is such that when the power is applied it is pressed toward the periphery of the wheel or tire and a secure grip is thereby obtained.

In order that my invention may be properly understood and readily carried into effect, I have hereunto appended one sheet of drawings, of which—

Figure 1:
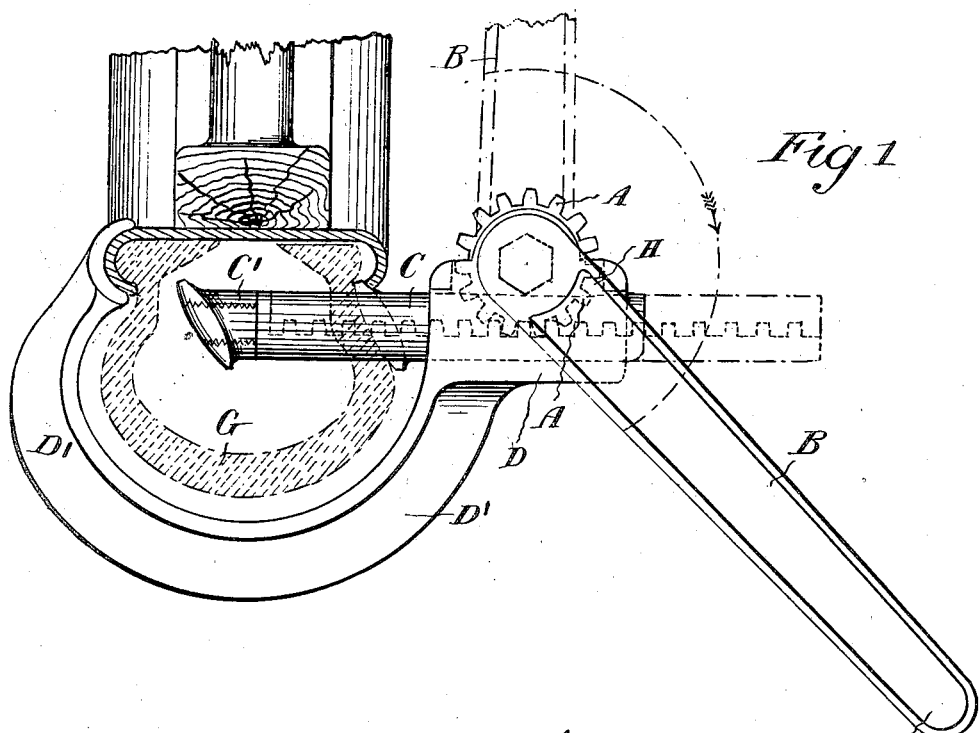
Figures 2, 3:
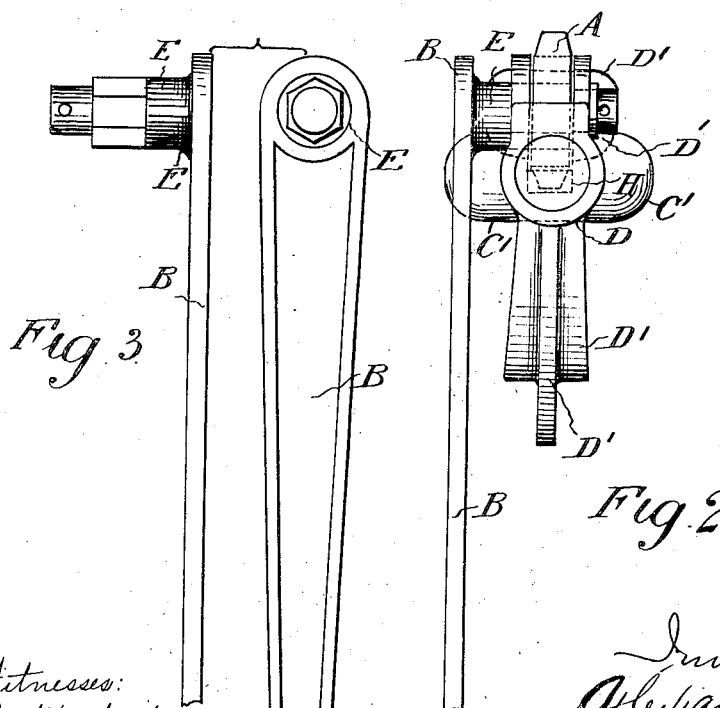

Figure 1 is a side elevation of the appliance embodying my invention, the dotted lines illustrate a tire to which the appliance is applied in the act of being loosened or detached. Fig. 2 is an end view of the same. Fig. 3 is a side elevation and end view respectively of the shaft or spindle of the operating lever.

According to my present improvements, the toothed segment or pinion A is formed as a separate portion of the appliance with a regular polygonally shaped axial hole or opening by which it is mounted on a portion of the shaft or spindle E of corresponding regular polygonal shape integral with the end of the actuating lever B, as seen more particularly in Fig. 3. The pinion A fits loosely between the two flanges of the bracket which form the bearings for the spindle E. The object of the regular polygonally formed shaft or spindle E is to enable the actuating lever to be readily removed and replaced in any suitable position rendering the appliance adaptable to various sizes of tires and so that the force applied to the lever may be most effective. The teeth of the pinion A engage with corresponding teeth on the sliding bar or ram C.

It will be observed that the teeth of the rack of the sliding bar or ram C are toward the bottom of a longitudinal groove or channel in the bar and that the ram C lies snugly within the circular hole or opening H of the bracket D, a portion of which is in the form of a jaw $D^1$, and that the pinion A and teeth of the same enter this groove or channel in their engagement with the teeth of the sliding bar or ram C thereby preventing any turning of the ram and that the teeth are well enveloped by the bracket D due to its construction. The pinion A is allowed sufficient side-play in the bearings to prevent binding. Of course it is to be understood that the teeth need not necessarily be at bottom of the sliding bar or ram as they may be at or near the top thereof although the former is preferable. The sliding bar or ram C may be made in two pieces, or the end $C^1$ made detachable, Fig. 1, so that a longer sliding bar or ram may be used in order that the appliance may be applicable to various sizes of tires.

It will be seen that from the design or construction of the appliance the act of forcing the tire out of the rim at the same time presses the appliance toward the periphery of the wheel and tire and a secure grip is thereby obtained. The dotted lines in Fig. 1 illustrate the sliding bar or ram C withdrawn, and also the pneumatic tire G of a wheel in the act of being loosened or detached.

The bracket arrangement is so formed that in use it may be made to pass over the rim or over the tire as may be found most suitable. Although I have described and shown the appliance with the end of the jaw pressing against the rim, and the end of the ram pressing against the tire, this arrangement may be reversed, or it may be so arranged that both ends could be applied to the tire.

It will also be obvious that the appliance can readily be applied to assist in placing the tire on the rim.

Claims:

1. A tire wrench having a tire loosening and gripping ram, and comprising a jaw constructed at one end with a rim-bearing adapted to engage one side of the wheel-rim, and at its other end with a bracket mounting the ram and presenting it in position to bear inwardly against the side of the tire opposite the rim-bearing; said jaw straddling the outside of the tire when its said end and plunger are in bearing thereon; and a combined plunger-projecting and jaw-swinging lever coöperating with the plunger to project it against the tire by the same direction of movement which, when the jaw is in the straddling position stated, causes the jaw to swing away from the rim and remove the tire.

2. In an appliance for loosening or attaching elastic tires, a bracket having a jaw constructed to grip one side of a wheel rim, a bearing portion facing said jaw and an arcuate bridge portion connecting said jaw and said bearing portion, a ram sliding in said bearing portion and means for actuating said ram to reciprocate in the direction of said jaw, said means also guiding said ram to prevent it from turning; said means comprising a level fulcrumed at the free end of said bearing portion exterior to said ram and adapted to swing in a radial direction of the tire, a pinion mounted coaxially with the lever fulcrumed in said bearing portion to be turned by said lever, said ram having gear teeth meshing with said pinion; whereby a continuous pull on the lever in one direction will first compress and thereupon remove the tire from the wheel, when the device is applied over the tire.

In testimony whereof I affix my signature in presence of two witnesses.

ALEXANDER TURNBULL.

Witnesses:
   JOHN LIDDLE,
   JOHN TRAIN LIDDLE.